Patented Jan. 1, 1924.

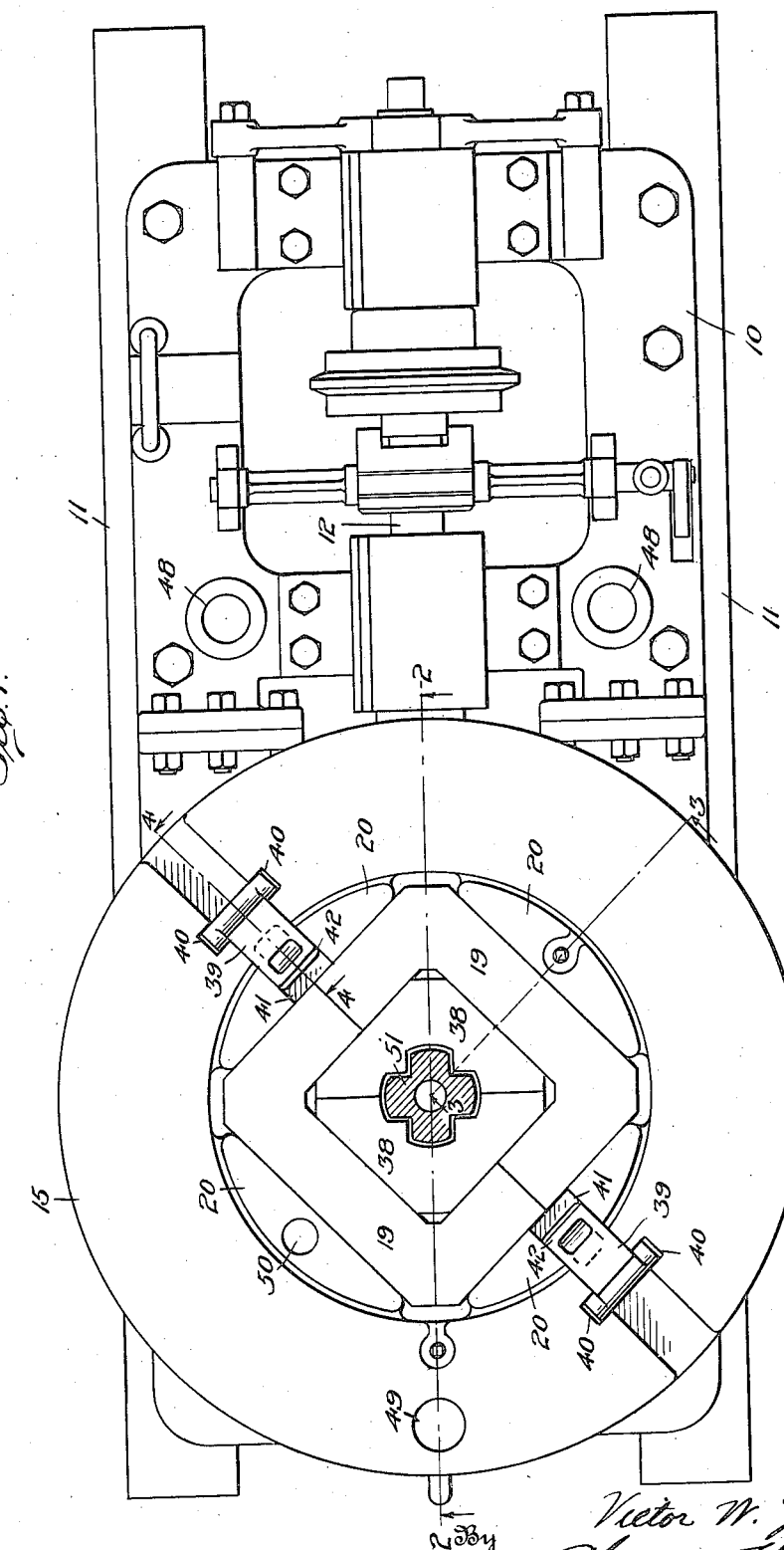

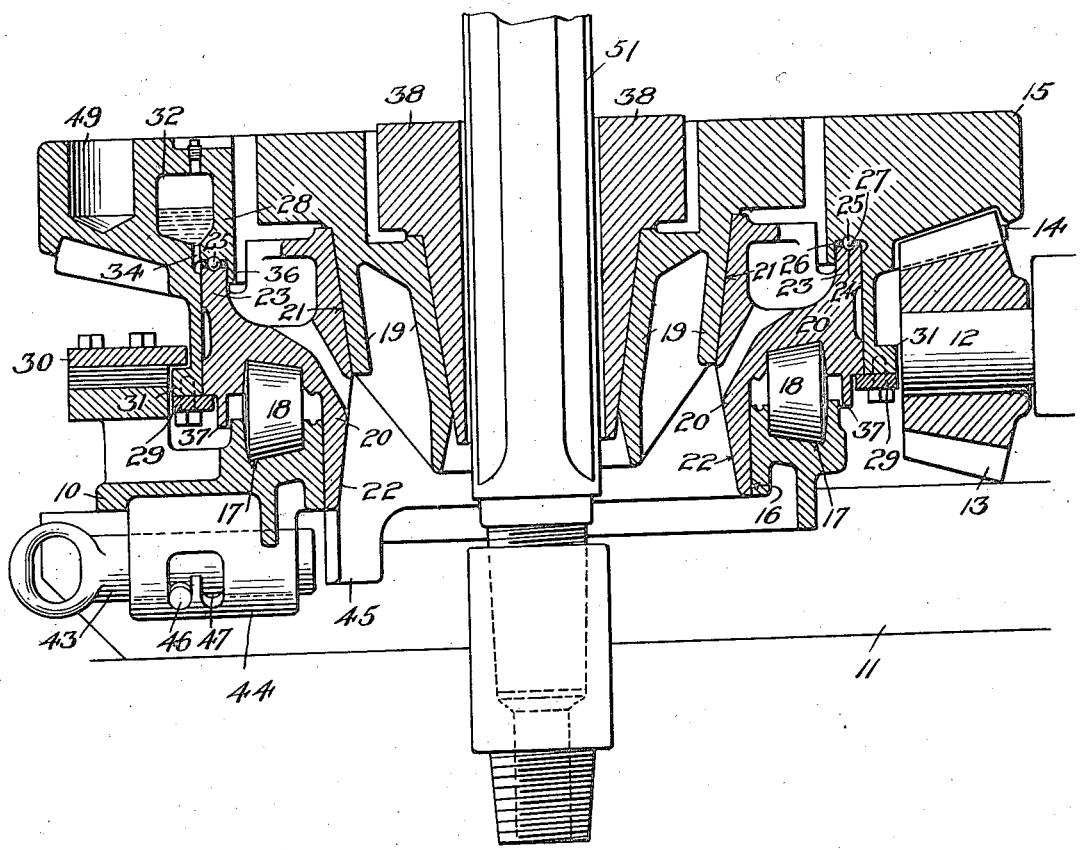
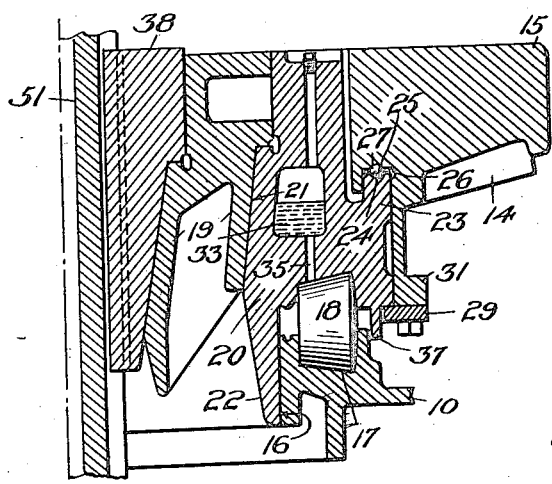
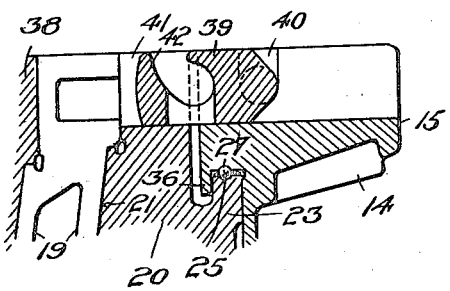

1,479,165

UNITED STATES PATENT OFFICE.

VICTOR W. ZILEN, OF CHATTANOOGA, TENNESSEE, ASSIGNOR TO LUCEY MANUFACTURING CORPORATION, OF CHATTANOOGA, TENNESSEE, A CORPORATION OF TENNESSEE.

DUPLEX-TABLE ROTARY DRILLING MACHINE.

Application filed March 3, 1922. Serial No. 540,726.

*To all whom it may concern:*

Be it known that I, VICTOR W. ZILEN, a citizen of the United States, residing at Chattanooga, in the county of Hamilton and State of Tennessee, have invented certain new and useful Improvements in Duplex-Table Rotary Drilling Machines; and I do hereby declare the following to be a full, clear, and exact description of the same, reference being had to the accompanying drawings, forming part of this specification.

This invention relates to rotary drilling machines for drilling wells and particularly to that type of rotary known as a duplex table rotary drilling machine.

An object of the present invention is to provide a rotary drilling machine designed to be utilized for the screwing together, as well as the unscrewing, of the pipe sections of the drill stem and also for similarly operating upon the sections of pipe constituting the well casing.

A further object of the invention is to arrange the table of the rotary having the ring gear thereon for rotating the table so that it will not have imposed upon it any of the load formed by the drill stem or well casing.

Another object is to provide means for excluding mud and water and other foreign substances from the bearings used in the apparatus and to provide a lubricating system that will thoroughly lubricate the bearings as well as the contacting rubbing surfaces of any of the several parts of the apparatus.

Another object is to produce a rotary machine having the most logical disposition of parts in order to obtain simplicity of construction and operation without decreasing its efficiency or increasing its cost of manufacture or maintenance.

In the accompanying drawings—

Figure 1 is a plan view of a duplex table rotary drilling machine constructed in accordance with the present invention, the main driving elements for rotating the table being shown in general outline;

Fig. 2 is a sectional view taken on the line 2—2 of Fig. 1; and

Fig. 3 is a detail view, in section, on the line 3—3 of Fig. 1.

Fig. 4 is a detail sectional view taken on the line 4—4 of Fig. 1.

In accordance with usual practice the bed plate or base 10 of the apparatus is securely mounted on skids or supports 11, suitable bearings being provided on said base for the drive shaft 12. On one end of said shaft 12 is a pinion 13 meshing with a ring gear 14 on the rotatable gear table 15. Power for rotating said shaft and table is transmitted from any suitable source ot supply to the shaft in any desired manner.

As it is desired to relieve table 15 of the load formed by the drill stem, or pipe casing, as the case may be, a second inner table 20 for carrying the load and transmitting it directly to the base 10 is provided, there being also, of course, means for locking the outer table 15 to said inner table 20 for simultaneous rotation when desired. In the preferred construction for attaining this result base 10 has a large circular opening 16 therein and has a circular race-way 17 extending around said opening for the reception of a series of anti-friction elements, preferably truncated cone bearings 18 on which the internal table 20 is rotatably mounted, the table 20 telescoping, so to speak, in the outer table 15. Said table 20 has a centrally disposed bore 21 therein for the master bushing 19 and has a cylindrical depending flange 22 that extends downwardly through the opening 16 in base 10. While any desired type of master bushing may be used, it is preferably made square at the top with a conical body and is made in halves to facilitate its being placed in and removed from the table 20.

Formed on the exterior surface of the inner table 20 is a circular flange 23 provided on its top surface with a race-way 24 for a series of anti-friction elements 25 mounted in a retainer 26. The outer table 15 also has a corresponding race-way 27 formed in a similar flange 28 on its inner surface adapted to overlie flange 23 and to receive said anti-friction elements 25. In this way the outer table 15 having the ring gear 14 thereon is rotatable on the inner table 20 and is supported thereby while the latter is rotatably mounted directly on the base 10. This will result in the load being carried by table 20 being directly transmitted to the base so that the anti-friction elements 24 between the two tables may be in the form of comparatively small ball bearings while the elements between inner table 20 and the base are, as before stated, in the form of truncated cone bearings of sufficient size to stand up under the pressure which is naturally placed upon them.

The wall of outer table 15, below flange 28 extends down to a point opposite the bottom face of flange 23 on inner table and to prevent the two tables moving relatively to one another axially of the bore 21, a locking ring 29, preferably made in two sections, is secured to the bottom of the outer ring 15 and projects inwardly under the flange 23 on the inner table. This, together with flanges 23, 28, holds the two tables rigidly together and both tables, as a unit, are held against movement on base 10 by hold down plates 30 secured on said base and projecting over an outwardly extending flange 31 on the outer table 15.

In order that both sets of anti-friction elements, together with any of the rubbing surfaces between the several parts, may be properly lubricated, a lubricant chamber or reservoir 32 is formed in the outer table 15 and another reservoir 33 is provided in the inner table 20. Reservoir 32 communicates with bearings 25 through a duct 34 and the lubricant is free to flow from said bearings down between the rubbing surfaces of the two tables as well as between the locking ring 29 and the bottom surface of flange 23. Reservoir 33 likewise communicates with bearings 18 through a duct 35 and the lubricant from this reservoir is free to flow from said bearings down between the rubbing surfaces between table 20 and base 10.

Another essential feature of the present invention is the manner in which mud and water and other foreign substances are excluded from the anti-friction elements. This is accomplished by the provision of a skirt or depending flange 36 on the inner wall of the outer table 15 that overlaps flange 23 on table 20 and encloses the bearings 25 and the provision of a similar depending skirt or flange 37 on the outer face of table 20 that overlaps the upwardly projecting portion of base 10 in which is formed the race-way 17 and encloses the outer side of bearings 18.

The master bushing 19 is formed with a central opening, square at the top, for the reception of the drive bushing 38, also square at its top but formed with a conical body. As is understood, in the art, drive bushing 38 is utilized, when drilling, for driving the grief stem to which is connected the drill pipe but when it is desired to hold the drill sections in suspension and stationary for screwing or unscrewing the section the drive bushing is raised up out of the master bushing and the usual slip wedges inserted in the master bushing.

When it is desired that the two tables 15 and 20 be locked together, either for drilling or for connecting or disconnecting sections of the drill stem or pipe casing, locking dogs 39, pivotally mounted in recesses 40 in the top surface of table 15, are swung on their pivots and dropped into radial slots 41 in the inner table 20. If the outer table is to be rotated independently of the inner one, said dogs are swung back on their pivots out of slots 41, this movement of the dogs being facilitated by grasping a cross piece or bridging 42 formed on each of the dogs. A bolt 43 slidably mounted in a tubular housing 44 on base 10 is pushed inwardly to a position where it will engage a downwardly projecting lug 45 on table 20 and hold said table stationary when the outer table 15 is to be rotated alone. The bolt 43 is retained in either its inner or outer positions by a laterally projecting pin 46 thereon working in an inverted U-shaped slot 47 in the bolt housing 44.

The operation of the machine is as follows: For drilling, the outer table 15 is in a rotatively locked engagement with the inner table 20 by means of the locking dogs 39 so that they both rotate as a unit on cone bearings 18 when actuated by the drive shaft 12 through pinion 13 and ring gear 14. As the drilling progresses it becomes necessary to add sections of drill pipe, in which event the first operation is the unscrewing of a joint which may be done in either of two ways. One way is by holding the upper section of pipe and revolving the lower section, or it may be done by revolving the upper section and holding the lower section. In either case, the joint to be unscrewed is raised above the rotary tables, causing the drive bushing 38 to be raised up out of the master bushing 19 whereupon the ordinary slip wedges (not shown) for holding the pipe in suspension are substituted in the master bushing for the drive bushing. In carrying out the first method mentioned above, a wrench (not shown) is applied to the top section of pipe and the handle thereof allowed to back up against a post set in socket 48 in base 10. A second wrench is then applied to the lower section of pipe and its handle backed up against a post (not shown) in a socket 49 in table 15. The tables are then rotated and will turn the lower section while the upper one is fixed against rotation and so disconnect the sections. Should it be desired to rotate the upper section the locking dogs 39 are swung up out of the radial slots 41 in table 20 and the bolt 43 is moved inwardly to engage depending lug 45 on said table. The back up post formerly located in socket 49 in base 10 is also transferred to socket 50 in table 20. This will allow outer table 15 to be rotated while the inner table 20, together with the lower section of pipe, will be held stationary.

To add a section of pipe, the lower section of pipe must be held stationary for the reason of the danger of unscrewing the joints in the well while joining the sections above. This is accomplished in the same manner as explained above except that the direction of rotation of table 15 is reversed in the case of right hand threads on the drill pipe. A break out post may or may not be used in socket 50 since the slip wedges will keep the lower section from rotating while table 15 is rotated together with the top section of pipe.

What is claimed is:

1. In a rotary drilling machine, the combination of the base, a circular race-way in the base, anti-friction elements in said raceway, an inner table rotatable on said anti-friction elements, work gripping means carried by said inner table, an outer table rotatably mounted on the inner table, a second series of anti-friction elements interposed between the two tables, an internal depending skirt on the outer table overlapping the inner table for enclosing the second set of anti-friction elements, and means for locking said tables together for simultaneous rotation.

2. In a rotary drilling machine, the combination of the base, a circular race-way in the base, anti-friction elements in said raceway, an inner table rotatable on the anti-friction elements, work gripping means carried by the inner table, a depending skirt on the inner table overlapping the base and enclosing said anti-friction elements, an outer table rotatably mounted on the inner table, a second series of anti-friction elements interposed between the two tables, an internal depending skirt on the outer table overlapping the inner table and enclosing said second series of anti-friction elements, and means for connecting said tables together for simultaneous rotation.

3. In a rotary drilling machine, the combination of the base, a circular race-way in the base, anti-friction elements in said raceway, an inner table rotatably mounted on said anti-friction elements, means formed on said table for enclosing the anti-friction elements, work-gripping means carried by the inner table an outer table rotatably mounted on the inner table, a second series of anti-friction elements interposed between the two tables, means formed on the outer table for enclosing the second series of anti-friction elements, and means for connecting said tables together for simultaneous rotation.

4. In a rotary drilling machine, the combination of the base, an inner table rotatably mounted on the base, work-gripping means carried by said inner table, an outer table rotatably mounted on the inner table, a portion of said outer table overlying a portion of the inner table, means for locking said tables against relative movement longitudinally of the center of rotation, and means for retaining the outer table on the base.

5. In a rotary drilling machine, the combination of the base, an inner table rotatably mounted on the base, work-gripping means carried by said inner table, an outer table rotatably mounted on the inner table, and a locking ring removably secured to the outer table and projecting beneath the inner table.

6. In a rotary drilling machine, the combination of the base, an inner table rotatably mounted on the base, work-gripping means carried by said inner table, an outer table, an exterior flange on the inner table, said outer table overlying the flange on the inner table and being supported thereon, and a detachable locking ring secured to the outer table and projecting beneath the flange on the inner ring.

7. In a rotary drilling machine, the combination of the base, an inner table rotatably mounted on the base, work-gripping means carried by said inner table, anti-friction elements interposed between said table and base, an exterior flange on the inner table, an outer table, an interior flange on the outer table overlying the flange on the inner table, anti-friction elements between said flanges, a locking ring detachably secured to the outer table and projecting beneath the flange on the inner table, a lubricant chamber in the inner table communicating with the anti-friction elements between said table and base, and a lubricant chamber in the outer table communicating with the anti-friction elements between the two tables and with the rubbing surfaces between the two tables and between the inner table and said locking ring.

8. In a rotary drilling machine, the combination of the base, an inner table rotatable on the base, anti-friction elements interposed between said table and base, work-gripping means carried by said table, an outer table rotatable on the inner table, anti-friction elements interposed between the two tables, a lubricant chamber in the inner table communicating with the anti-friction elements between the inner table and base, and a lubricant chamber in the outer table communicating with the anti-friction elements between the two tables.

VICTOR W. ZILEN.